US006529649B1

(12) United States Patent
Soole

(10) Patent No.: US 6,529,649 B1
(45) Date of Patent: Mar. 4, 2003

(54) OPTICAL FILTER WITH IMPROVED CROSSTALK REJECTION

(75) Inventor: Julian Bernard Donald Soole, Edison, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/562,839

(22) Filed: May 1, 2000

(51) Int. Cl.⁷ .............................. G02B 6/12; G02B 6/34
(52) U.S. Cl. ............................................ 385/14; 385/37
(58) Field of Search .................. 385/14, 24, 37, 385/39, 46, 129–132

(56) References Cited

U.S. PATENT DOCUMENTS

| | | | | | |
|---|---|---|---|---|---|
| 5,136,671 | A | * | 8/1992 | Dragone | 385/46 |
| 5,680,490 | A | * | 10/1997 | Cohen et al. | 385/24 |
| 5,862,279 | A | * | 1/1999 | Amersfoort et al. | 385/40 |
| 6,266,464 | B1 | * | 7/2001 | Day et al. | 385/37 |

FOREIGN PATENT DOCUMENTS

EP    0565308 A1  *  10/1993

OTHER PUBLICATIONS

S. Kamei et al. Very low crosstalk arrayed–waveguide grating multi/demultiplexer using cascade connection technique. Electronics Letters, vol. 36 No. 9, pp. 823–824. Apr. 2000.*
Y.P. Li et al. Silica–based optical integrated circuits. IEE Proceedings on Optoelectronics, vol. 143 No. 5, pp. 263–280. Oct. 1996.*
A. Himeno et al. Silica–Based Planar Lightwave Circuits. IEEE Journal of Selected Topics in Quantum Electronics, vol. 4 No. 6, pp. 913–924. Nov. 1998.*

* cited by examiner

Primary Examiner—Rodney Bovernick
Assistant Examiner—Mike Stahl

(57) ABSTRACT

The specification describes an optical integrated circuit for a wavelength division demultiplexer. The demultiplexer comprises an AWG filter comprising a waveguide grating array between multimoded coupler regions. Crosstalk in the optical signals from the demultiplexer is reduced by integrating a second AWG filter on each output waveguide. In an alternative embodiment the second filter is a generalized Mach-Zehnder (M-Z) interferometer filter employing multimode interference filter (MMI) coupler regions connected by a waveguide array.

12 Claims, 3 Drawing Sheets

OPTICAL FILTER WITH IMPROVED CROSSTALK REJECTION

FIELD OF THE INVENTION

This invention relates to optical integrated circuits (OICs) using wavelength division multiplexing (WDM), and more particularly to OICs having wavelength discriminating optical filters with improved crosstalk rejection.

BACKGROUND OF THE INVENTION

Optical filters are essential components for demultiplexers in WDM optical networks. Recent developments in wavelength discriminating optical filters include filter networks based on multiple path interferometry. These devices use a plurality of substantially uncoupled connecting waveguides between planar multimoded coupling regions. The connecting waveguides and connected coupling regions are constructed on an OIC substrate.

One approach employs a phased array of waveguides connecting two free-propagation regions, and is termed an array waveguide grating filter (AWG). This device is described in U.S. Pat. Nos. 5,002,350 and 5,136,671, issued Mar. 26, 1991 and Aug. 4, 1992 respectively. These patents are incorporated herein by reference for additional details not repeated here.

Another approach uses multimode interference (MMI) coupling regions that are connected by guides to form a generalized Mach-Zehnder Interferometer. See for example, "Novel InP-based phased array wavelength demultiplexer using a generalized MMI-MZ configuration", C. Van Dam et al. Proceedings of the European Conference on Integrated Optics, Genoa, Italy, 1994, pp. 275–278, also incorporated by reference herein.

As the number of channels in the WDM system is increased and/or wavelength spacing between channels is reduced, crosstalk becomes a dominant system issue. While phased waveguide array filters are remarkably effective even in devices with large channels (40 channel WDM devices for example) crosstalk is still a problem.

Sources of crosstalk usually fall into two categories. One is design of the device. There are physical limits to the amount of channel separation that can be geometrically accommodated for a given wafer (OIC) size, so there is a tradeoff between the size of the device and crosstalk tolerance. More difficult sources of crosstalk to address are those arising from material and processing variations. These can be abstruse and unpredictable. Nevertheless, the typical approach to the problem to date has been along these lines, i.e. developing new designs and improving process and material control. See for example, "The elimination of sidelobes in the arrayed waveguide WDM" by S. Day et al., presented at the Integrated Photonics Research Conference, April 29–May 2, 1996, Boston, Mass., and reported in 1996 Technical Digest Series, Vol. 6, of the Optical Society of America, pp. 48–52, ISBN—55752-438-6. While these efforts have met with some success, better solutions for the crosstalk problem in these devices are still sought.

STATEMENT OF THE INVENTION

I have developed an OIC approach to crosstalk rejection which deals directly with the problem by providing means in each output channel for filtering unwanted wavelengths. The device structure incorporates a second array of demultiplexers ganged with the first. The second array functions as a clean up filter for the primary demultiplexer. The demultiplexers in the second array are smaller in size than in the first, but otherwise may be essentially identical. This commonality between the filter structures allows the same OIC processing to be employed for making both. In the preferred embodiment of the invention the arrays are AWG arrays.

In an alternative embodiment, a MMI-MZ array is ganged with the primary demultiplexer for clean up filtering. In this case also, common processing steps may be used for fabricating the device.

DETAILED DESCRIPTION

Figure 1:
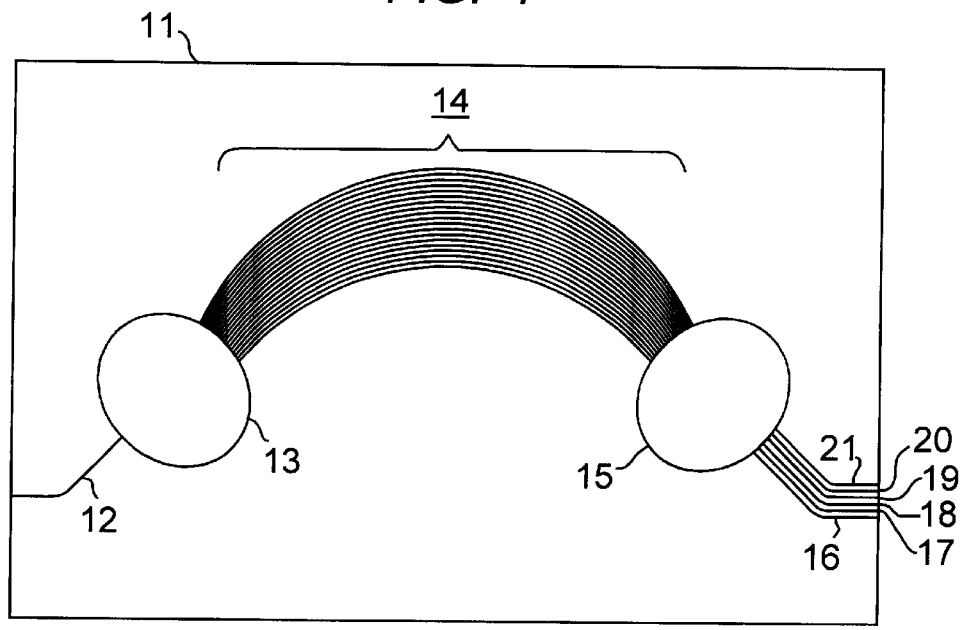
FIG. 1 is a schematic view of a demultiplexer device using an array of waveguides connecting two planar coupling regions.

A conventional arrayed waveguide grating filter is shown in FIG. 1. This plan view shows the interior portion 11 of a planar OIC which contains an array of waveguides 14 connecting first,13, and second,15, planar coupling regions. A single input 12 is shown for the multiplexed signal. Additional input ports may be provided to allow a vernier selection of the position of the input signal for optimizing device performance. Where multiple input ports are provided, only one of the input ports for a given multiplexed signal is typically used.

The WDM input signal is coupled into waveguide 12 at the input end of OIC 11. The OIC interfaces, typically optical fiber pigtails, which for simplicity are not shown in these figures, couple the multiplexed signal into the OIC at the input end, and couple the separated channels from the OIC output section to a plurality of fiber connections for distribution in the optical network. The WDM input signal enters coupler 13, and is distributed into portions which are coupled into the grating section 14. The grating section 14 comprises an array of waveguides of different linear lengths. The length of the individual waveguides in the array changes monotonically by a substantially equal amount across the array. This difference in the length of waveguides in the array results in a wavelength dependent tilt of the wave front of the lightwave in the grating section and shifts the input wave image to a wavelength dependent position. As the wavelength changes, the image of the input wave sweeps across and couples light into different output waveguides, i.e. 16–21.

The construction of the coupler elements follows conventional practice for star couplers. These devices are well known and suitable design techniques are well established in the art.

The number of grating waveguides is chosen so that they cover the far field distribution of the input waveguide ports of coupler 13. The number of grating waveguides is typically significantly greater, for example 3N, than the number N of output channels in the device to ensure relatively clean imaging of the input waves in the coupler slabs. The grating waveguides are closely spaced at the slab interfaces to minimize insertion loss. Power incident on the space between the waveguide ports is either lost, or may contribute optical noise as a result of reflections in the slab.

At the end of grating section 14 is another coupler 15 which functions as a mirror image of coupler 13 and separates the wave front in the coupler into six demultiplexed output signals 16–21. More details of the design and operation of waveguide star coupler regions is given by Yuan P. Li et al. in Chapter 8: Silicon Optical Bench Waveguide Technology, OPTICAL FIBER TELECOMMUNICATIONS, Vol. IIIB, pp. 319 et seq.

As mentioned above, device performance can be degraded by factors other than design limitations. For example, fluctuations in the index of refraction of the grating waveguides cause random phase errors in the grating and increase crosstalk. Also the precision of the device geometry design often cannot be realized due to variations in processing. Lithography generally determines spacing between waveguides, and can be accurately controlled. However, small errors in the absolute position of the waveguide elements, which have to be controlled over a relatively large wafer surface, can cause severe crosstalk problems. These errors have been addressed by providing more than one input port, as mentioned above, and selecting the input port that most effectively matches the output array ports to the system wavelengths required.

Despite careful efforts to control crosstalk in AWG type WDM demultiplexers, crosstalk levels in some devices, particularly those used in systems with a large number of channels, often exceed acceptable limits. An example is demonstrated by the following analysis. Based on addition of random binary crosstalk power to signal power, the induced power penalty may be derived from the crosstalk power by the expression:

$$P = -10 \log(1-e) \qquad \text{Eq.1}$$

where e is the crosstalk power and P is the power penalty measured in dB. See, e.g., Chapter 5 of "Optical Networks" by R. Ramaswami and K. N. Sivarajan, Morgan Kaufmann (1998). This indicates a power penalty of 0.5 dB for a crosstalk power of −10 dB, and a power penalty of 0.1 dB for a crosstalk power of −16.4 dB. In practice, an incoherent crosstalk level of <−12 dB is often used as a standard for preventing significant system degradation. In advanced systems, a more stringent value may be imposed.

Taking a crosstalk target of −12 dB, for example, and allowing a typical 3 dB system margin, it is thus found that a demultiplexing filter that passes one channel amongst 32 in a 32 channel WDM system must provide a rejection level of at least 29.9 dB for unwanted crosstalk. In a 40 channel system, this rejection level rises to 30.9 dB, and to 34 dB in an 80 channel system. The rejection requirement is increased even further if there exists, or could exist, power divergence between different channels, as this would raise crosstalk power with respect to the power of the demultiplexed signal. For example, if power divergence is 7 dB, a 40 channel demultiplexer would require crosstalk rejection of 37.9 dB, and an 80 channel device would require a rejection level of 41 dB. Such rejection values are extremely hard to achieve in AWG devices using current state-of-the-art technology.

A typical systems approach to provide this needed level of crosstalk rejection would be to modify the input of the channel at the channel station after distribution of the demultiplexed signals from the WDM. This would appear to be a simple and expedient solution. A suitable implementation would be to use discrete filter elements, which are bulk optical devices, pigtailed to each input at the station apparatus. The added cost of these devices, one for each WDM channel, and assembly of these devices at the receiver or the remote stations, is significant and for some applications, prohibitive.

Figure 2:
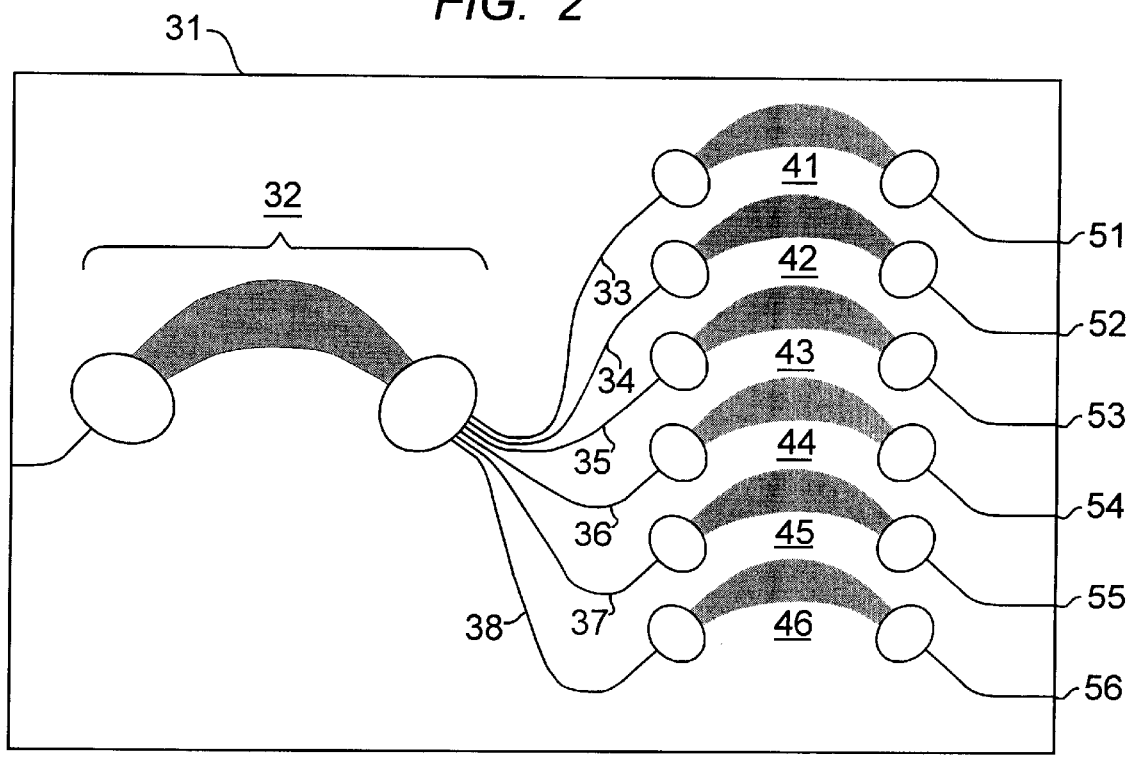
FIG. 2 is a schematic view of one embodiment of the demultiplexer device of the invention

The strategy used according to one embodiment of this invention is represented by FIG. 2. Here the OIC substrate carries the primary AWG demultiplexer, indicated generally at 32, and shown here with six output channels 33–38 for convenience in illustration. It will be recognized that this portion of the OIC is essentially that shown in FIG. 1. Each of the six output signals from demultiplexer 32 are routed by waveguides 33–38 into a secondary array of AWG devices 41–46. Devices 41–46 are identical in design concept to the AWG device 32. Each comprises an input coupler, a phased waveguide array, and an output coupler as shown. However, in contrast to the device 32, each of the devices 41–46 has a single output for each of the demultiplexed bands, and, as apparent, are substantially smaller. The devices 41–46 function as filters to clean up each of the demultiplexed bands and eliminate crosstalk. The power in the crosstalk that is eliminated by this secondary AWG array is discarded. The use of extra output waveguides, as well as input waveguides, may be used to implement the vernier adjustment strategy described earlier. To prevent the unwanted crosstalk from circulating in the slab of the filter devices 41–46, dummy output waveguides may be provided to tap off noise. For simplicity, the AWG arrays in FIGS. 1 and 2 show single input waveguides.

An alternative embodiment of the invention employs Mach-Zehnder filters for the secondary array. These devices also comprise multimode regions interconnected by waveguides of different optical path lengths. In this case the multimode regions are multimoded interference couplers designed to provide images of the input signal to the entrance of the interconnecting guides. Wavelength filtering devices using MMI couplers in a generalized Mach-Zehnder arrangement are described in the C. Van Dam et al. reference cited earlier. Also see, "General self-imaging properties in N×M multimode interference couplers including phase relations," by M. Bachmann, P.S.A. Besse, and H. Melchior, Applied Optics, Vol. 33, pp 3905–3911, 1994; and "Design of phased array wavelength division multiplexers using multimode interference couplers, by M. R. Paiam and R. I. MacDonald, Applied Optics, Vol. 36, pp. 5097–5108, 1997.

The MMI-MZ provides a transmission function that is periodic in wavelength, repeating every free spectral range. Typically, the peak transmission is contained within a region of order 1/N to 1/2N of the free spectral range, where N is the number of arms (waveguides) in the MMI-MZ device.

Figure 3:
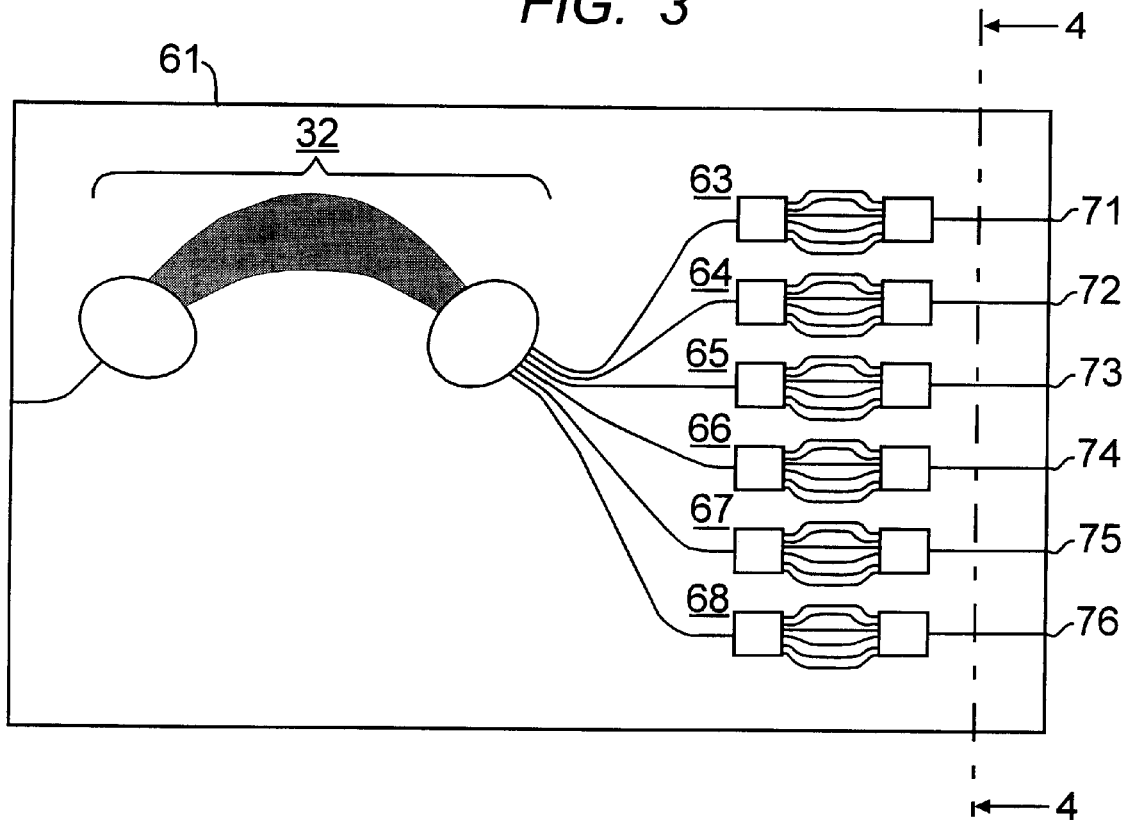
FIG. 3 is a schematic view of a second embodiment of the demultiplexer device of the invention.

An illustration of a demultiplexing device according to this aspect of the invention is shown in FIG. 3. The OIC substrate 61 contains the primary AWG demultiplexing stage 32, as before. The secondary channel filtering array comprises MMI-MZ devices 63–68 shown connected to the output of AWG demultiplexer 32 in a manner similar to that shown in FIG. 2. The six channel output, where the signal in each channel has been filtered of crosstalk, appears at 71–76 of the OIC.

It is recommended that the arrayed MMI-MZ filters 63–68 in the arrangement of FIG. 3, and the arrayed AWG filters 41–46 of FIG. 2, have pass bands that are significantly wider than the passband of the primary demultiplexer. This is to ensure that the secondary filter array does not introduce any loss of power in the main band of interest. It also allows for small process variations that could lead to a shift in the pass band away from the signal band. In some cases it may be useful to provide additional output channels to the MMI-MZ devices, as described earlier, for vernier adjustment in the MMI couplers.

Typically the number of waveguide arms interconnecting the MMI-MZ coupler regions is small in comparison with the number of waveguides in the grating array of the AWG devices described earlier, and the path length differences are not large. Accordingly, the secondary filter array of FIG. 3 is shown smaller than that in FIG. 2, and the size of the overall OIC maybe comparably reduced. Recalling that these figures are schematic, the actual size of the elements, and the actual size of the OICs may be significantly different than conveyed by the illustrations.

The MMI-MZ OIC embodiment is particularly useful when the overall system requirements are such that only a modest level of crosstalk rejection is required by the secondary filter array. This i s due to the fact that the MMI-MZ arrays are, generally speaking, somewhat less efficient in filtering unwanted wavelengths in a signal. The lower filter efficiency is partly due to the typically small number of arms in the phased array section. So, the tradeoff between the devices of FIGS. 2 and 3 will typically be filter performance vs. device size.

It will also be recognized that the OIC device of FIG. 3 and the OIC device of FIG. 2 share the common element of an array of waveguides where individual waveguides differ in length by predetermined amounts. This element is present in both the primary and the secondary arrays. Because of the relatively complex overall geometry of these arrays, they are ideally suited for a pure IC fabrication technique, wherein the layout complexity can easily be implemented using standard lithographic tools.

Optical integrated circuit fabrication techniques suitable for the manufacture of the devices described above may follow substantially known integrated circuit fabrication techniques. A example of a process sequence will be described in conjunction with FIGS. 4–9, which figures represent steps in the fabrication sequence.

Figure 4:
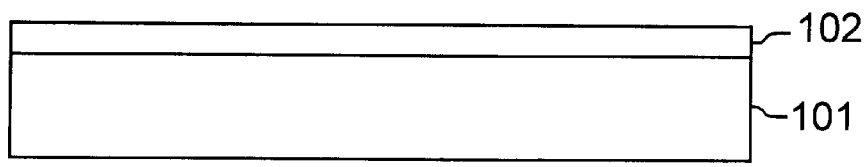
FIGS. 4–9 are schematic representations of process steps suitable for the manufacture of the devices of FIGS. 2 and 3.

With reference to FIG. 4, which is essentially a view through section 4—4 of FIG. 3, and is chosen mainly to illustrate the fabrication of the waveguide networks of the OICs of the invention, a silicon substrate 101 is shown with an oxide cladding layer 102 formed on the surface of the substrate. The preferred manufacturing method for these device is based on silicon optical bench (SOB) technology. Silicon is the preferred substrate choice largely for the well developed silicon technology, and the convenience of using doped $SiO_2$, a desirable waveguide material. Other materials can be used, based on materials such as InP, GaAs, fused silica, et al., even polymer materials.

The substrate 101 in FIG. 4 may be a portion of a larger wafer which is singulated after wafer fabrication is complete into several or many demultiplexer devices. The actual size of the optical integrated circuit for a typical AWG (primary demultiplexer)/AWG (secondary array) or an AWG/MMI-MZ device may be as small as 50 mm² for a device used for demultiplexing only a few channels, up to, for example, 50 cm² for a device built for many channels. Large devices, such as the latter, may consume an entire 5' wafer, and processing and packaging of single devices entirely at the wafer level is a likely manufacturing approach.

The lower cladding layer, or base layer, 102 is typically undoped silica, grown by steam oxidation or deposited by low pressure chemical vapor deposition (LPCVD). Other techniques for making thick $SiO_2$ layers, such as flame hydrolysis (FHD or VAD), also can be used. The thickness of the lower cladding layer is typically 10–50 microns.

The thick $SiO_2$ layers are typically consolidated by annealing, as is known in the art. Layers produced by so-called "soot" techniques, e.g. FHD, must be consolidated. Layers produced by e-beam techniques may be useful as deposited.

Figure 5:
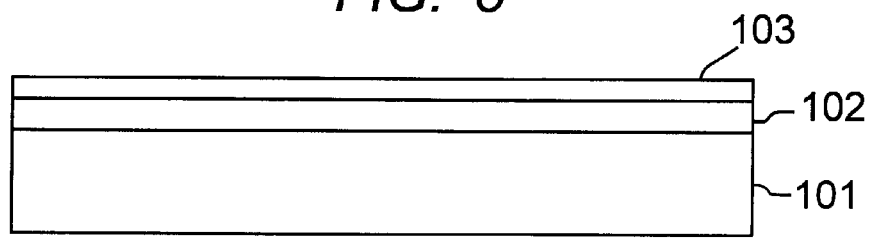

With reference to FIG. 5, a waveguide core layer 103 is deposited on the lower cladding layer 102. The essential property of core layer 103 is a refractive index that is slightly higher than that of the lower cladding layer. Typically this is obtained by doping the core layer. A traditional dopant in the CVD process has been phosphorus, which may produce a refractive index difference, $\Delta$, between the doped core and the undoped cladding of 0.4–0.8%, and is suitable for the devices described here. Alternatively, higher $\Delta$ values may be provided using Ge doping, which allows waveguides with smaller bend radii to be used without detrimental radiation losses, thus providing more compact device structures. Other deposition processes and other dopant and dopant combinations are possible. The thickness of the core layer 103 corresponds to the waveguide dimension. The waveguides are typically approximately square in shape, to accommodate essentially circular propagating modes. The width and thickness of the waveguides are typically in the range 2–10 $\mu$m.

Figure 6:
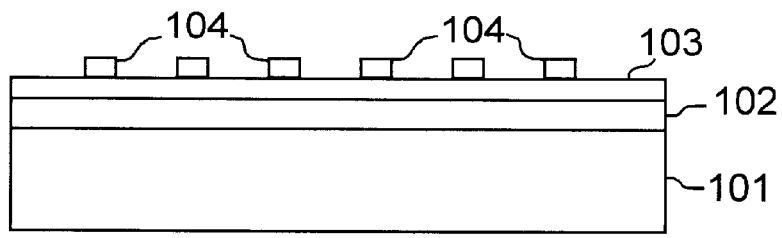
Figure 7:
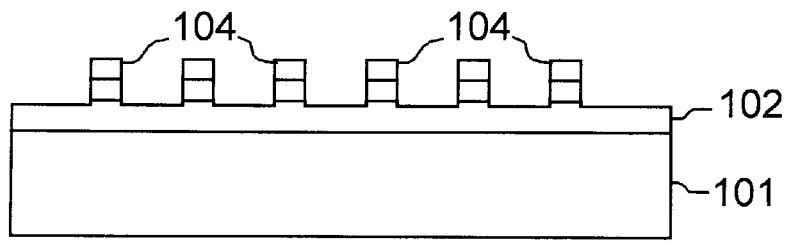
Figure 8:
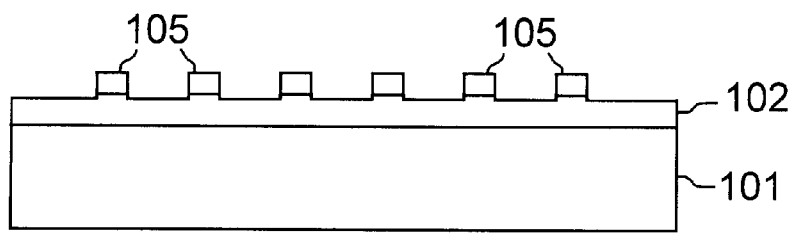

As shown in FIG. 6, the waveguide layer 103 is masked with a photolithographic mask having features 104, corresponding to the six waveguides appearing in FIG. 3. The mask is preferably a tri-level photoresist. Alternatively a hard mask of, e.g. chrome or silicon, may be used. The wafer is then etched using dry etching, preferably reactive ion etching (RIE), to define the waveguides as shown in FIG. 7. Other suitable etching techniques such as chemically assisted ion beam etching (CAIBE) or inductively coupled plasma reactive ion etching (ICP-RIE) may be used. Dry etching is preferred because it forms relatively vertical sidewalls for the waveguides. The photomask is then removed leaving the structure of FIG. 8, with individual waveguides shown at 105. The slight over etch shown in the figures is to ensure complete optical isolation between the waveguides. Since the dimensions involved are relatively large, control of the etch to the desired end point is straightforward.

Figure 9:
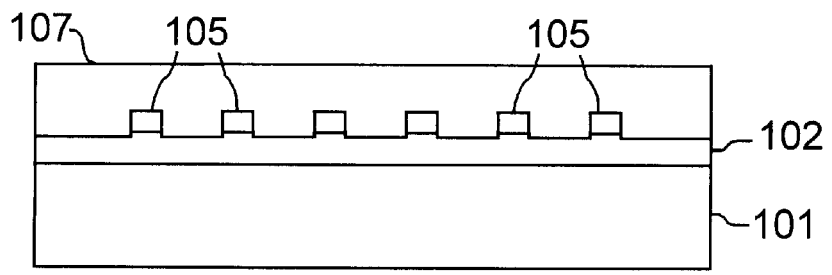

Referring to FIG. 9, the waveguides 105 are overcoated with upper cladding layer 107. This layer may be undoped silica, the same as the lower cladding layer 102. However it is important to completely fill the spaces between the waveguides. To ensure this, a doped silica upper layer may be used, which can be reflowed at moderate annealing temperatures to eliminate voids in the structure. The upper cladding layer 107 may have a thickness in the range 5–50 microns. The preferred approach to producing thick $SiO_2$ layers is to deposit them in more than one step, with annealing steps intervening.

It is evident that the processing required for the secondary filter array of the invention is essentially identical to that required to form the primary wavelength division demultiplexer. The only significant modification in the manufacturing process is the configuration of the mask set used in the lithography steps. Thus a major improvement in device performance is obtainable with a minimum of process modification.

A demultiplexer device according to the invention was constructed using 0.9% index contrast doped silica waveguides. The demultiplexer was designed for a 100 GHz 16 channel WDM system operating around a nominal wavelength of 1.55 $\mu$m. The primary demutliplexer AWG provided approximately 35–40 dB of crosstalk suppression. The secondary AWGs, monolithically integrated with the first, provided approximately 30–35 dB of additional crosstalk suppression. The combined demultiplexer/filter of the invention provided enhanced crosstalk suppression of approximately 65–75 dB. The passband of the secondary AWG filters was more than twice that of the primary AWG demutliplxer.

For the purpose of definition here, and in the appended claims, the term "waveguide array" is intended to define an array of from 4–100 optical waveguides with each waveguide in the array having a unique length that differs from the other waveguides in the array by a predetermined amount. The term "uniform phased waveguide array" is intended to define an array of from 4–100 optical waveguides all extending substantially parallel, with each waveguide in the array, in ascending order, having a length that differs by a substantially constant amount from its ascending neighbor.

As mentioned above, the number of output waveguides may be increased to provide vernier adjustment in the device. Therefore, a given device may have a number N of secondary filters and a greater number M of output waveguides where at least one of the M output waveguides is optically coupled to each of the N secondary filters.

Various additional modifications of this invention will occur to those skilled in the art. All deviations from the specific teachings of this specification that basically rely on the principles and their equivalents through which the art has been advanced are properly considered within the scope of the invention as described and claimed.

I claim:

1. An optical integrated circuit (OIC) demultiplexer system comprising:
   a. a substrate,
   b. an OIC demultiplexer system input waveguide on the substrate,
   c. a demultiplexer optically coupled to the OIC input waveguide, the demultiplexer comprising:
      i. an input multimoded region,
      ii. an output multimoded region, the output multimoded region having a plurality N of output waveguides, and
      iii. a waveguide array optically coupled to the input multimoded region and to the output multimoded region,
   d. a plurality N of filters each of the plurality N of filters optically coupled to one of the plurality N of output waveguides, each of the plurality N of filters comprising:
      iv. an input multimoded region,
      v. an output multimoded region,
      vi. a waveguide array optically coupled to the input multimoded region and to the output multimoded region, and
   e. a single output waveguide optically coupled to each of the N filters
   the OIC further characterized in that the optical paths:
      1. between the OIC demultiplexer system input waveguide and the demultiplexer,
      2. between the demultiplexer and the plurality N of filters,
      3. between the plurality N of filters and the single demultiplexer system output waveguide optically coupled to each of the filters,
   consist of a single waveguide, and the OIC further characterized in that the waveguide array of the demultiplexer has a passband substantially different than the passband of the waveguide arrays of the filters.

2. The OIC of claim 1 wherein the waveguide arrays are uniform phased waveguide arrays.

3. The OIC of claim 1 wherein the substrate is silicon.

4. The OIC of claim 3 wherein the waveguides comprise doped $SiO_2$.

5. The OIC of claim 1 wherein the plurality N of filters are MMI-MZ filters.

6. The OIC of claim 1 further including a signal input, said signal input comprising at least four channels, and means for coupling the signal input to the OIC input waveguide.

7. The OIC of claim 6 wherein said single output waveguide carries a single channel.

8. The OIC of claim 7 wherein each of the plurality N of output waveguides from the demultiplexer carries a single channel.

9. An optical integrated circuit (OIC) demultiplexer system comprising:
   a. a silicon substrate,
   b. a lower cladding layer on the silicon substrate, the lower cladding layer comprising $SiO_2$ and having a thickness in the range 10–50 microns,
   c. a pattern of doped $SiO_2$ optical waveguides on the lower cladding layer, the pattern of optical waveguides comprising:
      1. an OIC demultiplexer system input waveguide on the substrate,
      2. a demultiplexer optically coupled to the OIC demultiplexer system input waveguide, the demultiplexer comprising:
         i. an input multimoded region,
         ii. an output multimoded region, the output multimoded region having a plurality N of output waveguides, and
         iii. a waveguide array optically coupled to the input multimoded region and to the output multimoded region,
      3. a plurality N of filters each of the plurality N of filters optically coupled to one of the plurality N of output waveguides, each of the plurality N of filters comprising:
         iv. an input multimoded region,
         v. an output multimoded region,
         vi. a waveguide array optically coupled to the input multimoded region and to the output multimoded region,
      4. a single demultiplexer system output waveguide optically coupled to each of the N filters, and
   d. an upper cladding layer covering said pattern of optical waveguides, said upper cladding layer comprising doped $SiO_2$, and having a thickness in the range 5–50 microns
   the OIC further characterized in that the optical paths:
      between the OIC demultiplexer system input waveguide and the demultiplexer;
      between the demultiplexer and the plurality N of filters; and
      between the plurality N of filters and the single demultiplexer system output waveguide optically coupled to each of the filters,
   consist of a single waveguide, and the OIC further characterized in that the waveguide array of the demultiplexer has a passband substantially different than the passband of the waveguide arrays of the filters.

10. The OIC of claim 9 further including a signal input, said signal input comprising at least four channels, and means for coupling the signal input to the OIC input waveguide.

11. The OIC of claim 10 wherein said single output waveguide carries a single channel.

12. The OIC of claim 11 wherein each of the plurality N of output waveguides from the demultiplexer carries a single channel.

* * * * *